United States Patent [19]

Mee et al.

[11] Patent Number: 4,965,183
[45] Date of Patent: Oct. 23, 1990

[54] TRI-NUCLEAR DYES FOR PHOTOGRAPHIC COMPOSITIONS AND METHOD OF PREPARTION

[75] Inventors: John D. Mee; Jal F. Munshi, both of Rochester, N.Y.

[73] Assignee: Eastman Kodak Company, Rochester, N.Y.

[21] Appl. No.: 253,835

[22] Filed: Oct. 5, 1988

[51] Int. Cl.$^5$ .............................................. G03C 1/26
[52] U.S. Cl. ..................................... 430/578; 430/573
[58] Field of Search ................................. 430/578, 573

[56] References Cited

U.S. PATENT DOCUMENTS

| | | |
|---|---|---|
| 3,539,349 | 11/1970 | Brooker et al. ................. 430/567 X |
| 3,565,630 | 2/1971 | Millikan et al. . |
| 3,822,135 | 7/1974 | Sakai et al. . |
| 4,725,532 | 2/1988 | Kameoka et al. . |
| 4,751,175 | 6/1988 | Aotsuka et al. . |

FOREIGN PATENT DOCUMENTS 1471701  4/1977  United Kingdom .

OTHER PUBLICATIONS

Chemical Abstracts 82382m, vol. 75, 1971.

Primary Examiner—Paul R. Michl
Assistant Examiner—Mark R. Buscher
Attorney, Agent, or Firm—Paul L. Marshall

[57] ABSTRACT

Compounds of the formula:

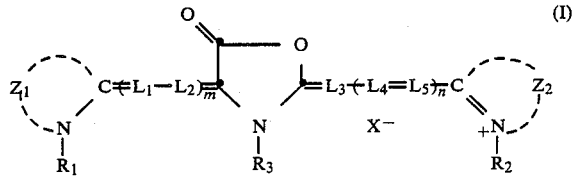

where $Z_1$, $Z_2$, $L_1$-$L_5$, $R_1$, $R_2$, $R_3$, m, and n are as defined herein are disclosed. A method of making the compounds is also disclosed. The compounds are useful as sensitizing dyes in photographic elements.

10 Claims, No Drawings

TRI-NUCLEAR DYES FOR PHOTOGRAPHIC COMPOSITIONS AND METHOD OF PREPARTION

FIELD OF THE INVENTION

This invention relates to organic dye compounds and to photography, particularly sensitizing dyes for photographic compositions.

BACKGROUND OF THE INVENTION

Tri-nuclear complex cyanine dyes are widely known and a number of them have been used as sensitizing dyes in photographic compositions. Such dyes can generally be represented by the formula:

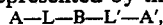

in which A represents a nucleus of the cyanine dye type, B represents a cyclic ketomethylene residue, A' represents a nucleus of the cyanine dye type or a cyclic ketomethylene residue, and L and L' represent one or more methine linkages. Examples of such dyes are described in Hamer, *Cyanine Dyes and Related Compounds*, 1964, chapter XV. A number of cyclic ketomethylene residues have been utilized as B, such as:

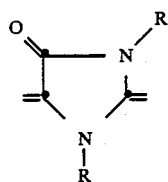

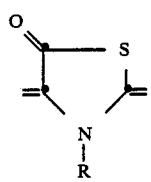

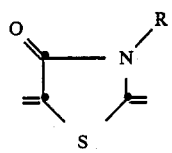

Tri-nuclear dyes having such ketomethylene residues for B in the formula above may be prepared by a variety of methods known in the art. A common preparation scheme is exemplified as follows:

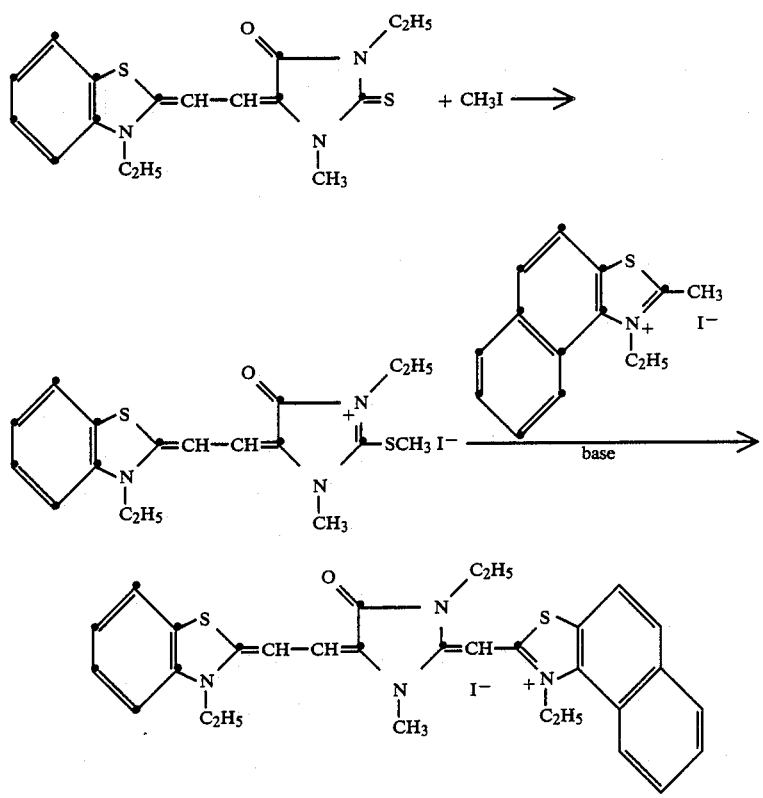

In such a reaction scheme, standard modifications include varying the length of the methine linkages (keeping the same odd/even number arrangement) and substituting S for the N—CH₃ group in the center ketomethylene nucleus.

Known methods cannot, however, be used to prepare tri-nuclear dyes having a

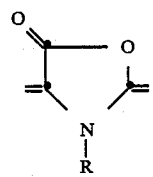

nucleus as the center ketomethylene nucleus. It is toward such dyes that the present invention is directed.

SUMMARY OF THE INVENTION

According to the present invention, there are provided dyes according to the formula:

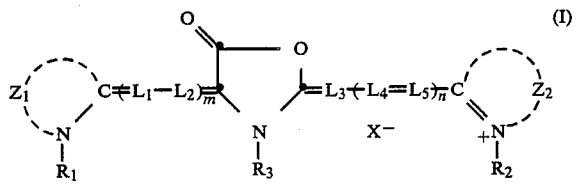

wherein
- $R_1$, $R_2$, and $R_3$ are each independently substituted or unsubstituted alkyl,
- $L_1$, $L_2$, $L_3$, $L_4$, and $L_5$ are each independently substituted or unsubstituted methine groups,
- $Z_1$ and $Z_2$ each independently represents the atoms necessary to complete a substituted or unsubstituted 5- or 6-membered heterocyclic ring structure,
- m and n are each independently 0, 1, or 2, and
- X is an anion or an anionic group on the compound to form an intramolecular salt.

In one embodiment of the invention, dyes according to formula (I) are prepared by bringing into reactive contact at least one compound having the formula:

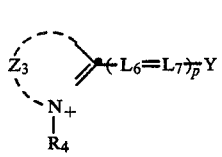

wherein $L_6$ and $L_7$ are defined the same as $L_1$-$L_5$, $Z_3$ is defined the same as $Z_1$ and $Z_2$, $R_4$ is defined the same as $R_1$-$R_3$, p is 0, 1, or 2, and Y is a group that is displaced as a result of a nucleophilic attack at $L_7$, with acetic anhydride, an organic base, and a compound having the formula:

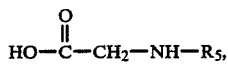

wherein $R_5$ is substituted or unsubstituted alkyl or aryl.

The dyes of formula (I) are useful as sensitizing dyes for silver halide in photographic compositions.

DESCRIPTION OF THE PREFERRED EMBODIMENTS

According to formula (I), $R_1$, $R_2$, and $R_3$ are independently substituted or unsubstituted alkyl, preferably of from 1 to 6 carbon atoms, or substituted or unsubstituted aryl, preferably of from 6 to 15 carbon atoms. Examples of such alkyl groups include methyl, ethyl, n-propyl, isopropyl, n-butyl, isobutyl, and the like. The alkyl groups may be substituted with substituents known in the art, such as sulfo, carboxyl, halogen, alkoxy, aryl, and the like (e.g., 3-sulfopropyl, 2-chloropropyl, benzyl, etc.). Examples of aryl groups useful as $R_1$, $R_2$, and $R_3$ include phenyl, naphthyl, and the like. The aryl groups may be substituted with substituents known in the art such as sulfo, carboxyl, halogen, alkoxy, alkyl, and the like. In a preferred embodiment, $R_1$ is the same as $R_2$. In another preferred embodiment, at least two of $R_1$, $R_2$, or $R_3$ are sulfoalkyl, sulfatoalkyl, or carboxyalkyl. In yet another preferred embodiment, $R_1$ and $R_2$ are each independently sulfoalkyl, sulfatoalkyl, or carboxyalkyl.

$Z_1$ and $Z_2$ each represent the atoms necessary to complete a substituted or unsubstituted 5- or 6-membered heterocyclic ring. The ring may be substituted with known substituents, such as alkyl, alkoxy, halogen, and the like, or it may have substituents that join together to form a fused ring system. Examples of heterocyclic rings for $Z_1$ and $Z_2$ include a thiazole nucleus (e.g., thiazole, 4-methylthiazole), a benzothiazole nucleus (e.g., benzothiazole, 5-methoxybenzothiazole), a naphthothiazole (e.g., naphtho[2,1-d]thiazole, 5-methoxynaphtho[2,3-d]thiazole), a thiazoline nucleus (e.g., thiazoline, 4-nitrothiazoline), an oxazole nucleus (e.g., oxazole, 4-phenyloxazole), a benzoxazole nucleus (e.g., benzoxazole, 5-trifluoromethylbenzoxazole), a naphthoxazole nucleus (e.g., naphtho[3,1-d]oxazole, naphtho[2,3-d]oxazole), an isoxazole nucleus (e.g., 5-methylisoxazole), an oxazoline nucleus (e.g., 4,4-dimethyloxazoline), a selenazole nucleus (e.g., 4-methylselenazole), a benzoselenazole nucleus (e.g., benzoselenazole, 5-methoxybenzoselenazole), a naphthoselenazole nucleus (e.g., naphtho[2,1-d]selenazole), a terazole nucleus (e.g., benzoterazole, 5-hydroxybenzoterazole), a 3,3-dialkylindolenine nucleus (e.g., 3,3-dimethylindolenine, 3,3-dimethyl-5-methoxyindolenine), an imidazole nucleus (e.g., 1-alkylimidazole, 1-alkyl-5-methoxybenzimidazole, 1-aryl-5,6-dichlorobenzimidazole), a pyridine nucleus (e.g., 2-pyridine, 3-methyl-4-pyridine), a quinoline nucleus (e.g., 2-quinoline, 3-methyl-2-quinoline, 8-fluoro-2-quinoline), an imidazo[4,5-b]quinoxaline nucleus (e.g., 1,3-diethylimidazo[4,5-b]quinoxaline), an oxadiazole nucleus, a thiadiazole nucleus, a tetrazole nucleus, a pyrimidine nucleus, and the like. In a preferred embodiment of the invention, $Z_1$ and $Z_2$ are the same. In another preferred embodiment, $Z_1$ and $Z_2$ represent the atoms necessary to complete a substituted or unsubstituted thiazoline, thiazole, benzothiazole, or a benzoxazole nucleus.

$L_1$, $L_2$, $L_3$, $L_4$, and $L_5$ each independently represents a substituted or unsubstituted methine group. Examples of substituents for methine groups include alkyl (e.g., of from 1 to 6 carbon atoms), aryl (e.g., phenyl), aralkyl (e.g., benzyl), alkoxy (e.g., methoxy, ethoxy). Also, substituents from the methine chain may form a 4- to 6-membered ring with each other. In a preferred embodiment, the methine groups are unsubstituted.

According to formula (I), m and n are each independently 0, 1, or 2. In a preferred embodiment, m equals n. In an another preferred embodiment, m and n are both equal to 1.

X is an anion or an anionic group on the compound of formula (I) to form an intramolecular salt. Examples of X anions include p-toluene sulfonate, halogen (e.g., bromide, iodide, chloride), ethyl sulfate, and perchlorate. Examples of anionic groups that can be part of the compound include sulfo, sulfato, and carboxyl.

In a preferred embodiment, the dyes of the invention are according to formula:

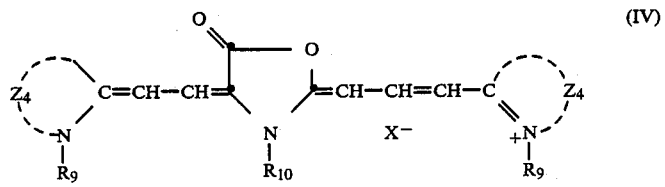

(IV)

where $R_9$ and $R_{10}$ are each independently substituted or unsubstituted alkyl or substituted or unsubstituted aryl as described for $R_1$–$R_3$ in formula (I), $Z_4$ represents the atoms necessary to complete a 5- or 6-membered heterocyclic ring as described in formula (I) for $Z_1$ and $Z_2$, and X is as defined in formula (I).

Examples of dyes according to formulas (I) and (IV) include the following:

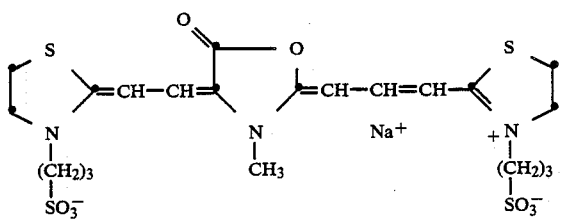

1

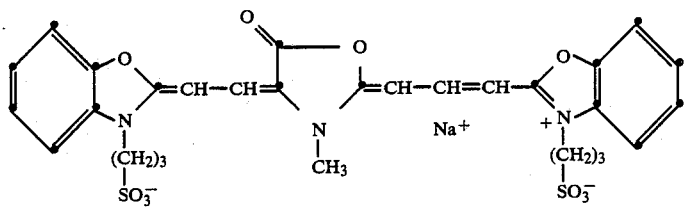

2

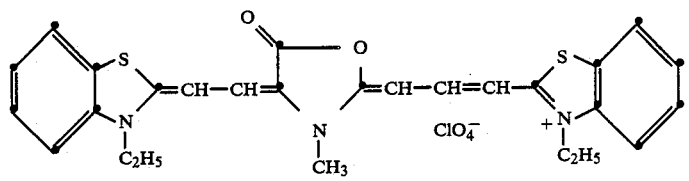

3

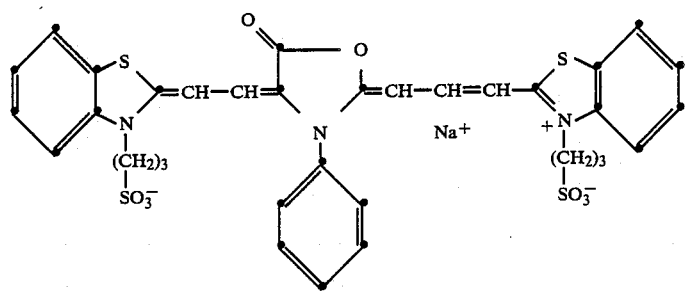

4

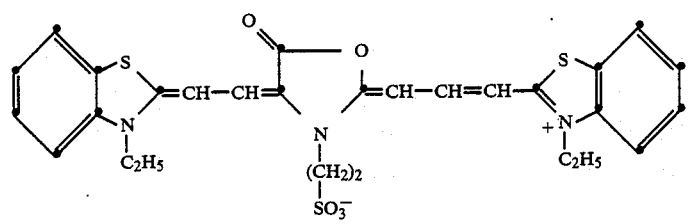

5

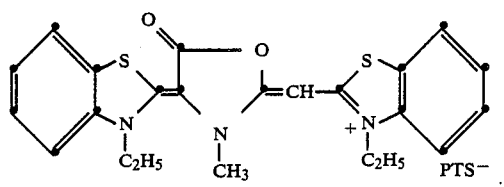
(PTS = p-toluene sulfonate)
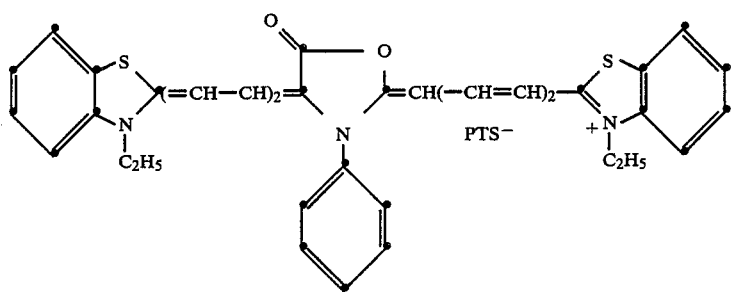
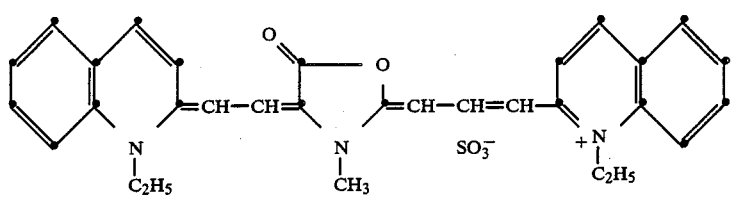
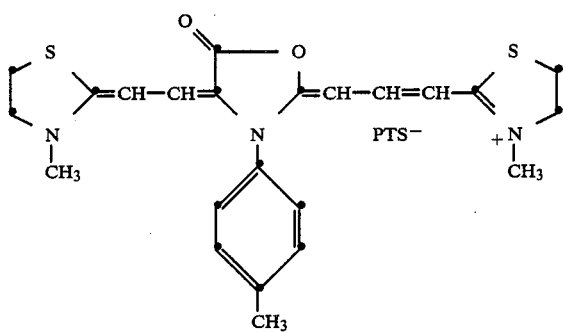
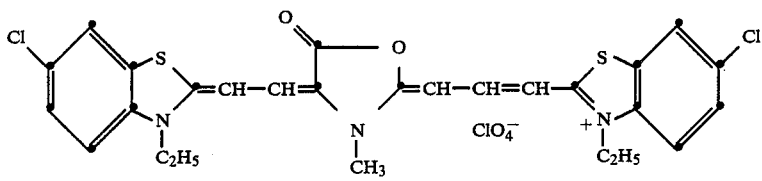
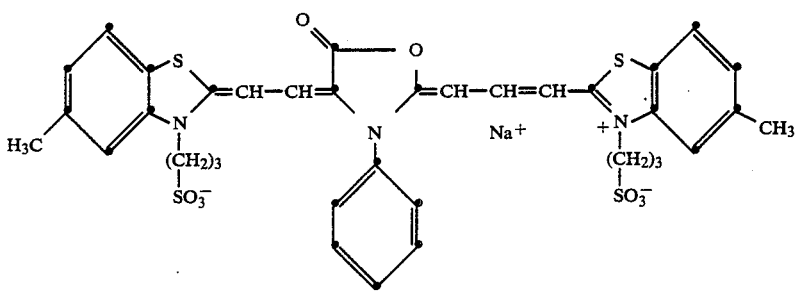

-continued

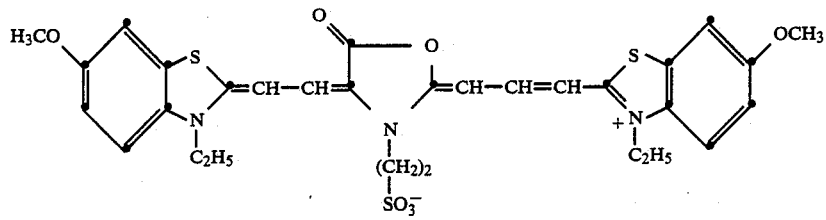
12

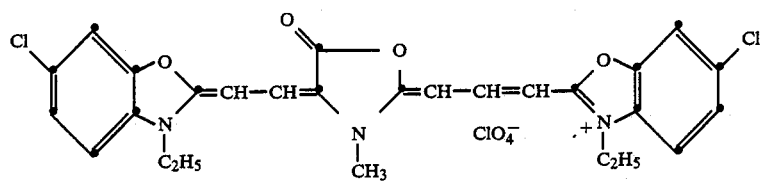
13

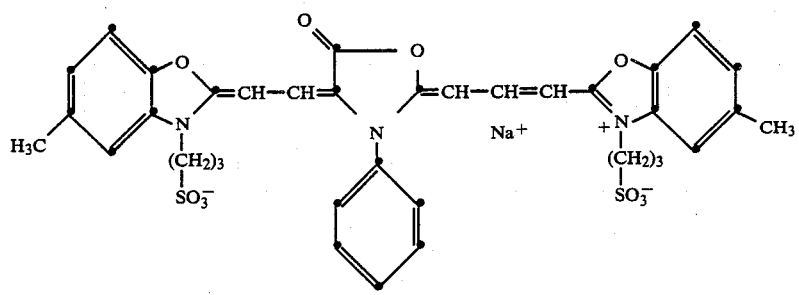
14

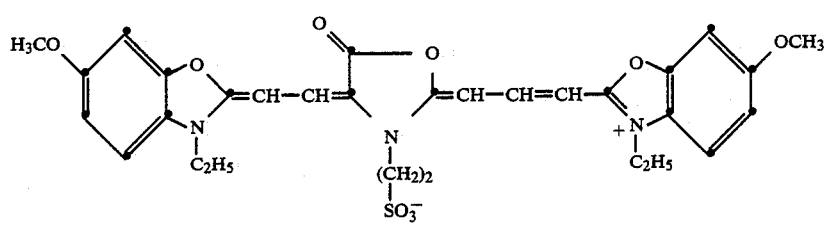
15

In one embodiment of the invention, there is provided a method of making the dyes of formula (I). This method involves bringing into reactive contact at least one compound having the formula:

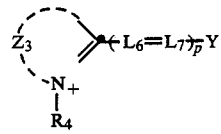
(II)

wherein $L_6$ and $L_7$ are defined the same as $L_1$-$L_5$, $Z_3$ is defined the same as $Z_1$ and $Z_2$, $R_4$ is defined the same as $R_1$-$R_3$, p is 0, 1, or 2, and Y is a group that is capable of being displaced as a result of a nucleophilic attack at $L_7$, with acetic anhydride, an organic base, and a compound having the formula:

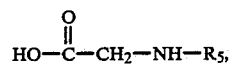

wherein $R_5$ is defined the same as $R_1$-$R_4$.

According to formula (II), Y is a group that is capable of being displaced as a result of a nucleophilic attack at $L_7$. Such groups are well-known in the art and include:

where $R_6$ is substituted aryl as described above with respect to $R_1$-$R_5$, $R_7$ is hydrogen or COCH$_3$, as well as -SR$_8$ where $R_8$ is defined the same as $R_1$-$R_5$.

Generally, to bring into reactive association, the compounds are simply mixed with the liquid acetic anhydride acting as a liquid medium as well as a reactant and heated (e.g., 100° C.). The dye of formula (I) thus formed can then be purified by standard techniques well-known in the art, such as recrystallization.

The dyes of formula (I) have good adsorption to silver halide and are useful as sensitizing dyes for silver halide photographic emulsions. The silver halide that the dyes of formula (I) spectrally sensitize can be any type of silver halide that is useful in photographic emulsions. This includes silver bromide, silver iodide, silver chlorobromide, silver bromoiodide, silver chlorobromoiodide, or mixtures thereof. The silver halide can be in the form of 3-D grains, as described in Research Disclosure, Dec., 1978, item 17643 (hereinafter referred to as "Research Disclosure I"), or in the form of tabular grains, as described in Research Disclosure, Jan., 1983, item 22534, the disclosures of which are incorporated herein by reference in their entirety. The silver halide can be present in any amount known in the art to be useful in photographic emulsions.

Various precipitation techniques can be used to prepare the silver halide grains, as is well-known in the art. Examples of such techniques include single-jet, double-jet (including various removal techniques), accelerated flow rate, and interrupted precipitation techniques.

The silver halide to be used in the invention may be advantageously subjected to chemical sensitization with compounds such as gold sensitizers (e.g., aurous sulfide) and others known in the art. Compounds and techniques useful for chemical sensitization of silver halide are known in the art and described in *Research Disclosure I* and the references cited therein.

The silver halide may be sensitized by the dye of formula (I) by any method known in the art, such as described in *Research Disclosure I*. The dye may added to an emulsion of the silver halide grains and a hydrophilic colloid at any time prior to or simultaneous with the coating of the emulsion on a photographic element. The dye/silver halide emulsion may be mixed with a dispersion of color image-forming coupler immediately before coating or in advance of coating (e.g., 2 hours), although the latter is preferred as the dyes of formula (I) offer the advantage of good stability in silver halide/-color image-forming coupler gelatin melts.

One or more spectral sensitizing dyes may be used with the dyes of formula (I) to achieve a desired spectral sensitization of the silver halide as well as to achieve results such as supersensitization, as discussed by Gilman in *Photographic Science and Engineering*, Vol. 18, 1974, pp. 418–30. Examples of supersensitizing dye combinations include those disclosed in McFall et al U.S. Pat. No. 2,933,390, Jones et al U.S. Pat. No. 2,937,089, Motter U.S. Pat. No. 3,506,443, and Schwan et al U.S. Pat. No. 3,672,898, the disclosures of which are incorporated herein by reference.

The amount of sensitizing dye in the emulsion can be any amount that is known in the art to be useful for spectral sensitization of silver halide. The quantity of dye employed will vary with the specific dye or dye combination chosen as well as the size and aspect ration of the grains. It is known in the photographic art that optimum spectral sensitization is obtained with organic dyes at about 25 to 100 percent or more of monolayer coverage of the total available surface area of surface sensitive silver halide grains, as disclosed for example, in West et al, "The Adsorption of Sensitizing Dyes in Photographic Emulsions," *Journal of Phys. Chem.*, Vol. 56, p. 1065, 1952 and Gilman et al U.S. Pat. No. 3,979,213. Optimum dye concentration levels can be chosen by procedures taught by Mees, *Theory of the Photographic Process*, Macmillan (1942), pp. 1067–69, the disclosure of which is incorporated herein by reference.

Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin), phthalated gelatin, and the like), and others as described in *Research Disclosure I*. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like, as described in *Research Disclosure I*. The vehicle can be present in the emulsion in any amount known to be useful in photographic emulsions.

The emulsion can also include any of the addenda known to be useful in photographic emulsions. These include chemical sensitizers, such as active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 5 to 8, and temperatures of from 30° to 80° C., as illustrated in *Research Disclosure*, June, 1975, item 13452 and U.S. Pat. No. 3,772,031.

Other addenda include antifoggants, stabilizers, filter dyes, light absorbing or reflecting pigments, vehicle hardeners such as gelatin hardeners, coating aids, dye-forming couplers, and development modifiers such as development inhibitor releasing couplers, timed development inhibitor releasing couplers, and bleach accelerators. These addenda and methods of their inclusion in emulsion and other photographic layers are well-known in the art and are disclosed in *Research Disclosure I* and the references cited therein.

The emulsion may also include brighteners, such as stilbene brighteners. Such brighteners are well-known in the art.

The emulsion layer containing silver halide sensitized with the dye of formula (I) can be coated simultaneously or sequentially with other emulsion layers, subbing layers, filter dye layers, interlayers, or overcoat layers, all of which may contain various addenda known to be included in photographic elements. These include antifoggants, oxidized developer scavengers, DIR couplers, antistatic agents, optical brighteners, light-absorbing or light-scattering pigments, and the like.

The layers of the photographic element can be coated onto a support using techniques well-known in the art. These techniques include immersion or dip coating, roller coating, reverse roll coating, air knife coating, doctor blade coating, stretch-flow coating, and curtain coating, to name a few. The coated layers of the element may be chill-set or dried, or both. Drying may be accelerated by known techniques such as conduction, convection, radiation heating, or a combination thereof.

Photographic elements comprising the composition of the invention can be black and white or color. A color photographic element generally contains three silver emulsion layers or sets of layers: a blue-sensitive layer having a yellow color coupler associated therewith, a green-sensitive layer having a magenta color coupler associated therewith, and a red-sensitive layer having a cyan color coupler associated therewith. The photographic composition of the invention is advantageously utilized in a blue-sensitive layer of a color photographic element. These color image-forming couplers along with other element ocnfigurations are well-known in the art and are disclosed, for example, in *Research Disclosure I*.

Photographic elements comprising the composition of the invention can be processed in any of a number of well-known photographic processes utilizing any of a number of well-known processing compositions, described, for example, in *Research Disclosure I* or in James, *The theory of the Photographic Process* 4th, 1977.

The invention is described further in the following Examples.

EXAMPLE 1

Preparation of Dye 1

Anhydro-2-(2-anilinovinyl)-3-(3-sulfopropyl) thiazolinium hydroxide (6.53 g), sarcosine (1.0 g), and acetic anhydride (40 ml) were mixed in a flask, which was then placed in an oil bath preheated to 100° C. and triethylamine (5.05 g) was added immediately. The mixture was stirred and heated for 5 minutes, cooled to room temperature, and diluted to 250 ml with CH$_3$CN. The mixture was chilled and the precipitate collected, washed with CH$_3$CN, then ethyl ether, and dried. This solid was dissolved in 175 ml boiling methanol containing about 1% acetic acid and filtered hot. To the hot solution was added 1 g sodium acetate dissolved in 15 ml water. The mixture was then cooled while stirring for about 1 hour. The solid was collected washed with methanol containing about 1% acetic acid, then ethyl ether, and dried to yield 2.51 g of Dye 1. λ-max=582 nm (H$_2$O), ε-max=14.81×10$^4$. NMR and combustion analyses were consistent with the assigned structure.

EXAMPLE 2

Preparation of Dye 2

A compound having the formula:

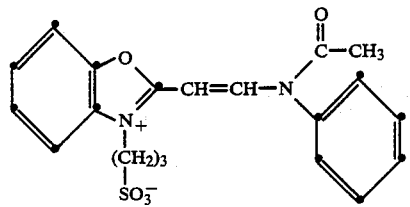

(4.00 g), sarcosine (0.45 g), and acetic anhydride (20 ml) were placed in a flask and heated at 100° C. with stirring while triethylamine (2.4 g) was added all at once. The sides of the flask were washed down with 5 ml acetic anhydride and the mixture was stirred at 100° C. for an additional 5 minutes and then cooled to room temperature. The mixture was diluted to 125 ml with CH$_3$CN and the solid material filtered off, washed with CH$_3$CN and then diethyl ether. This solid was dissolved in 75 ml hot methanol containing 1% acetic acid. The solution was filtered and 0.5 g sodium acetate in 7.5 ml water was added to the filtrate. The liquid was then stirred for 30 minutes as it cooled. The solid thus formed was collected by filtration, washed with methanol containing 1% acetic acid, then with diethyl ether, and dried to yield 1.35 g of Dye 2. λ-max=604 nm (methanol), ε-max=21.3×10$^4$. NMR and combustion analyses were consistent with the assigned structure.

EXAMPLE 3

Photographic Element Containing Dye 1

A chemically-sensitized silver chlorobromide (70:30) cubic rhodium-doped emulsion having an average grain size of 0.28 μm was spectrally sensitized with 100 mg of dye 1 per mole silver. The emulsion was coated on a subbed polyester support at a level of 4.0 g Ag/m$^2$ and overcoated with a gelatin layer. The element was exposed using a wedge spectrometer and processed. The resulting image showed that the film had a peak photographic sensitivity at 630–640 nm and low sensitivity at 450–500 nm. The transmission spectrum of the non-image area of the processed element showed no dye retention.

EXAMPLE 4

Photographic Element Containing Dye 2

An element was prepared as in Example 3 except that the emulsion was sensitized with Dye 2. The element was exposed and processed as in Example 3. The resulting image showed that the film had a peak photographic sensitivity at 640–660 nm.

The invention has been described in detail with particular reference to preferred embodiments thereof, but it will be understood that variations and modifications can be effected within the spirit and scope of the invention.

What is claimed:

1. A photographic element comprising a support having thereon a layer comprising a silver halide emulsion wherein the silver halide is spectrally sensitized with a dye having the formula:

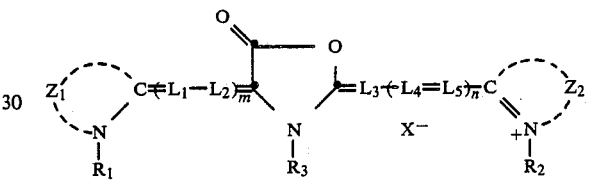

wherein
- $R_1$, $R_2$, and $R_3$ are each independently substituted or unsubstituted alkyl or substituted or unsubstituted aryl,
- $L_1$, $L_2$, $L_3$, $L_4$, and $L_5$ are each independently substituted or unsubstituted methine groups,
- $Z_1$ and $Z_2$ each independently represents the atoms necessary to complete a substituted or unsubstituted 5- or 6-membered heterocyclic ring structure,
- m and n are each independently 0, 1, or 2, and
- X is an anion or an anionic group on the compound to form an intramolecular salt.

2. A photographic element according to claim 1 wherein $Z_1$ and $Z_2$ are the same and $R_1$ and $R_2$ are the same.

3. A photographic element according to claim 1 wherein m equals n.

4. A photographic element according to claim 2 wherein m equals n.

5. A photographic element according to claim 1 wherein $L_1$, $L_2$, $L_3$, $L_4$, and $L_5$ are each CH.

6. A photographic element according to claim 2 wherein $L_1$, $L_2$, $L_3$, $L_4$, and $L_5$ are each CH.

7. A photographic element according to claim 3 wherein $L_1$, $L_2$, $L_3$, $L_4$, and $L_5$ are each CH.

8. A photographic element according to claim 1 wherein at least two of $R_1$, $R_2$, or $R_3$ are sulfoalkyl, sulfatoalkyl, or carboxyalkyl.

9. A photographic element according to claim 1 wherein $R_1$ and $R_2$ are each independently sulfoalkyl, sulfatoalkyl, or carboxyalkyl.

10. A photographic element according to claim 1 according to the formula:

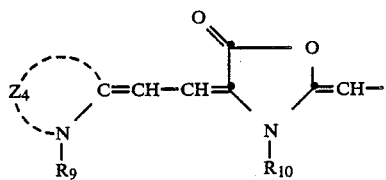
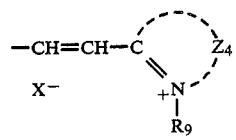
wherein
- $R_9$ and $R_{10}$ are each independently substituted or unsubstituted alkyl or substituted or unsubstituted aryl,
- $Z_4$ represents the atoms necessary to complete a 5- or 6-membered heterocyclic ring, and
- X is an anion or an anionic group on the compound to form an intramolecular salt.
* * * * *